T. V. Waymoth. Sheet 1. 4 Sheets.

Envelope Mach.

No. 2,787. Reissued Oct. 22, 1867.

Witnesses:

S. D. Law

Fred'k B. Sears

Inventor

J. C. Berlin

Geo. W. Jones

Assignees of

Thos. V. Waymoth

T. V. Waymoth. Sheet 2. 4 Sheets

Envelope Mach.

No. 2,787. Reissued Oct. 22, 1867.

Witnesses:

S. D. Law

Fred. B. Sears

H. C. Perkins

Geo. H. Jones

Assignees of

Thos. V. Waymoth

T. V. Waymoth. Sheet 3. 4 Sheets.

Envelope Mach.

No. 2,787. Reissued Oct. 22, 1867

Witnesses:

J. D. Lai

Fred. P. Lemo

J. H. C. Berlin

Geo. H. Jones

Assignees of Thos. V. Waymoth

T. V. Waymoth. Sheet 4. 4 Sheets.
Envelope Mach.
No. 2,787. Reissued Oct. 22, 1867.
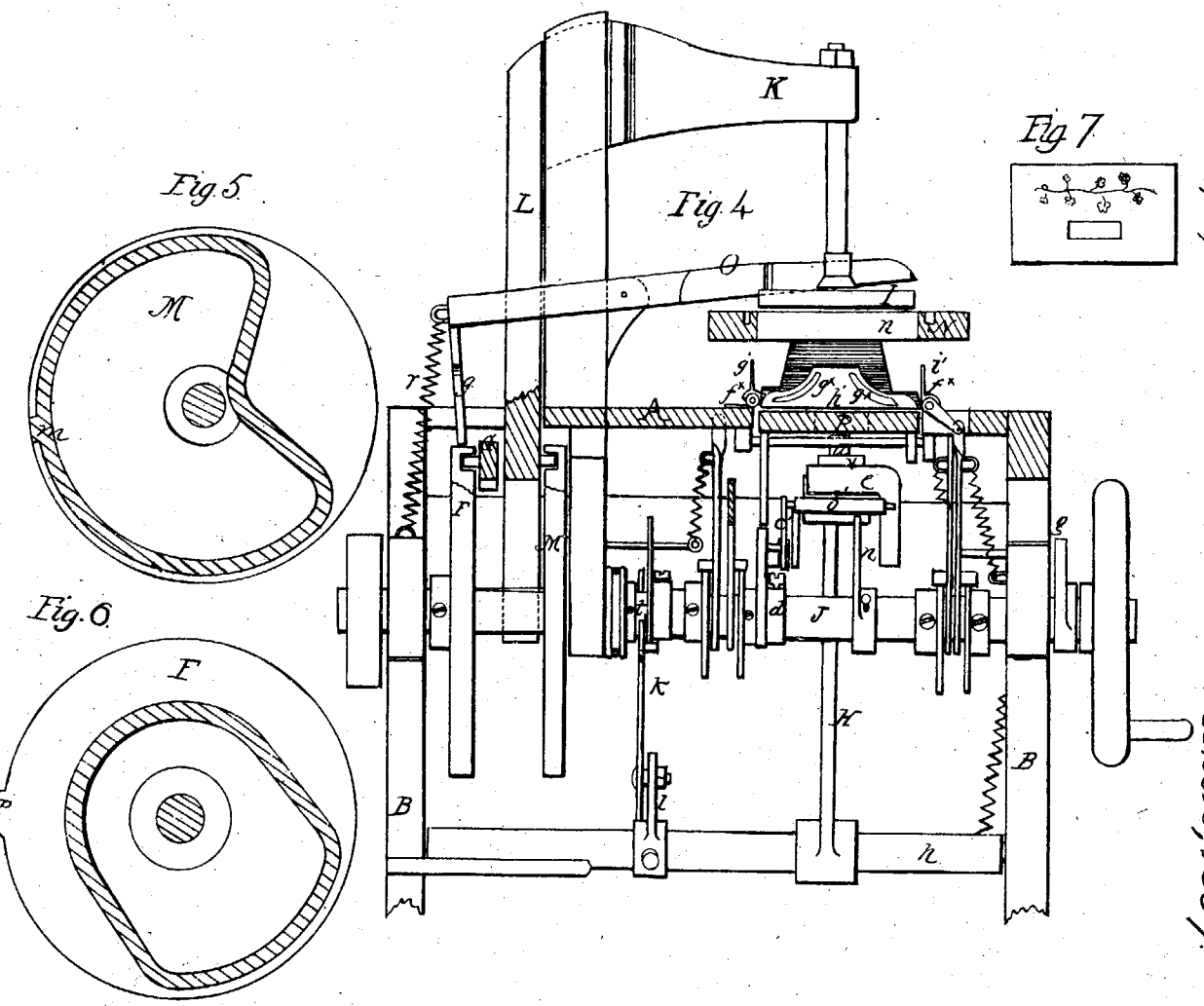
Witnesses:
S. D. Law
Fred. T. Sears
H. C. Perkins
Geo. H. Jones
Assignees of
Thos. V. Waymoth

United States Patent Office.

HENRY C. BERLIN AND GEORGE H. JONES, OF NEW YORK, N. Y., ASSIGNEES OF THOMAS V. WAYMOTH.

*Letters Patent No.* 58,327, *dated September* 25, 1866; *reissue No.* 2,787, *dated October* 22, 1867.

ENVELOPE MACHINE.

The Schedule referred to in these Letters Patent and making part of the same.

TO ALL WHOM IT MAY CONCERN:

Be it known that THOMAS V. WAYMOTH, of the city of New York, in the county of New York, and State of New York, has invented a new and useful Envelope Machine, and that the following is a full, clear, and exact description thereof, and of its mode or manner of operation, reference being had to the accompanying drawings, and to the letters of reference marked thereon, and making a part of this specification.

In the manufacture of envelopes by machinery, as heretofore generally carried on, the seal-flaps of the blanks have been first gummed, and then sufficient time allowed for such gum to dry before the other flaps are gummed and the blanks folded; and it has also been attempted to apply the adhesive substance to the seal-flap and the back flap at about the same time, and just previous to the folding, using different adhesive substances for the two flaps, and applying them in different ways.

This invention has reference to a machine in and by which the seal-flaps of the blanks for envelopes are gummed, by pickers or gummers similar to those used to gum the back flap, or by any equivalent mechanism, and the several flaps can be gummed at or about the same time, or after the blank is put in the machine and before it is folded, whereby the time usually required for gumming and drying the seal-flaps is saved, and the use of different adhesive substances for the different flaps is not necessary; and consists, also, in an improved manner of supporting the table sustaining the envelope-blanks, by hinged arms, in combination with the gumming mechanism, by means of which the operation of introducing the blanks under the gummers is facilitated, and can be effected without stopping the machine; and also in the arrangement of a curved guide, conforming to the shape of the blank, in combination with the table or bed of the machine, so that the edges of the blanks bear or rest against such guide, and are prevented being turned in or up, as is the case by the action of the ordinary guide-pins; and also in causing the seal-flaps, while being folded, to bear on one or more of the folding-wings, which serve to fold the remaining flaps, or on parts or projections of said wings, or some equivalent mechanism, in such a manner that the gummed surface of the seal-flap is prevented from being brought in contact with the body of the envelope during the operation of folding, and adhering thereto; and also in the arrangement of lips, extending from the folding-wings over the joints of such wings in such a manner that the oil from such joints is prevented from coming in contact with the blanks, and jointed folded wings thus rendered practicable; and also in the combination with the gumming and folding mechanism of an endless apron, with radiating plates, or its equivalent, by which the envelopes, after being folded, are received from the folding-press, and kept separate from each other in such a position that the gum on the seal-flap can dry, and such seal-flap will not stick to the body of the envelope; and in causing such endless apron to pass at its receiving end over a square or polygonal shaft, so that the radiating plates are certain to assume the requisite position to receive the envelopes as they are discharged from the folding mechanism; and in combining with such revolving apron a rail or box, which prevents the envelopes dropping out from between the radiating plates of such apron before they have been carried to the receiving-box, and the gum on the seal-flap had sufficient time to dry; and also in a receiving-box, in combination with the discharging end of the endless apron, with a movable follower, whereby the envelopes, as they are discharged from the endless apron, are compressed slightly, and made ready to be put up in bundles or packages; and also in the arrangement of a suitable die, in combination with the platform which supports the blanks just before the creasing-plunger descends, so that any desired figure can be printed, stamped, or embossed on the seal-flap of the envelope while the blank passes from the gumming to the folding mechanism; and also in the arrangement of corresponding dies on the under side of the creasing-plunger, and on the upper surface of the platform supporting the blanks while the flaps are being folded, whereby any desired design, figure, or character can be printed, embossed, or stamped on the body of the envelope by the descent of the creasing-plunger, and while the envelope is supported on the folding-platform; and also in the arrangements of types, supported on a proper arm, and passing up through the folding-platform while the creasing-plunger descends, so that by the action of such types any desired word, character, or direction can be printed on the face of the envelope while the same is passing through the folding mechanism.

Figure 4 is a transverse vertical section through the line *y y*, fig. 3, and looking in the direction of the arrow opposite that line.

Figures 5, 6, are detached views of two of the cams which impart motion to some of the working parts of the machine.

Figure 7 is a face view of the folding-platform detached.

A represents the bed of the machine, supported on suitable legs, B. The table A*, which supports the blanks, is detached from the main portion of the bed, and is connected to it or to the frame which supports it by hinged arms *a*, so that such table can be turned in or out. From this table A* rises a curved guide, T, against which the edges of the blanks abut, so that such blanks can readily be brought in the desired position without bending up their edges. Above such table rise the pickers or gummers C C*, which serve to apply the gum to the blanks, and to lift one after another to be carried to the folding machine. The gummer C* applies the gum to the seal-flap, and the gummer C to the back flap of the envelope-blank.

Figure 3:
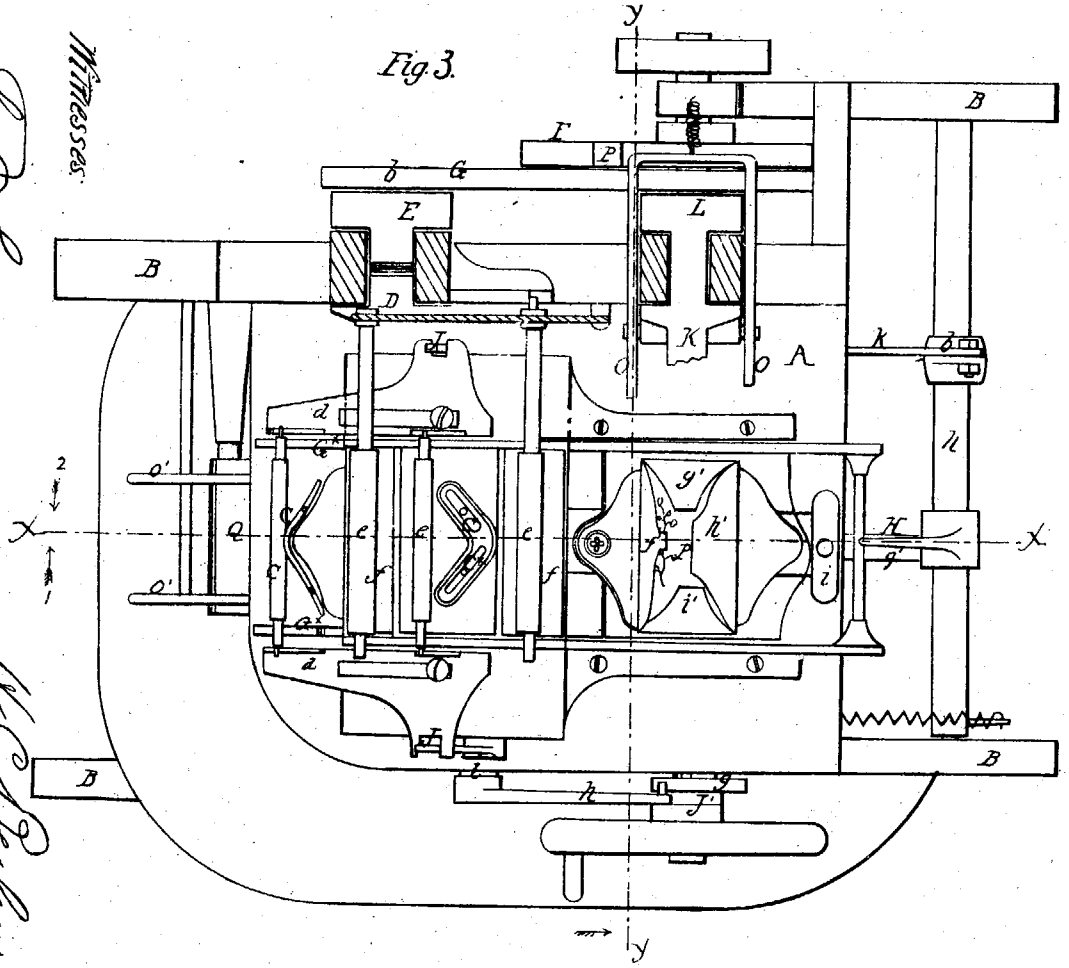
Figure 3 is a plan or top view of such machine, some parts being broken away to expose the working parts.

The gummers or pickers C C* are suspended from an arm, D, extending from a slide, E, to which a rising and falling motion is imparted by a cam, F, a detached face view of which is shown in fig. 6. Such cam acts on a lever, G, hinged to one of the legs B, and connecting with the slide E by a pivot, *b*. The gummers C C* are supplied with gum by the rollers *e e*, which have their bearings in a reciprocating carriage, *d*, by which they are alternately brought in contact with rollers *e e*, which revolve in the gum-boxes *f f*, and then are carried under the gummers C C* by the action of a cam, *g*, on an arm, *h*, mounted on a rock-shaft, *i*, from which two arms, *j j*, extend up into notches in the carriage *d*, as shown in fig. 3. By these means the seal and back flaps of the envelope-blank are gummed at or about the same time, after the blank is put in the machine, thus rendering it unnecessary to first gum the seal-flap and give it time to dry, and thereby saving the time required to effect such drying, or to use different adhesive materials for the different flaps, or apply such materials by different devices. The envelope-blanks are introduced into the machine before having been subjected to any gumming operation.

The mechanism described is arranged so as to gum the seal and back flap simultaneously, or nearly so; but it will be readily apparent that it would make no difference in the operation of the machine, in respect to proceeding with the folding of the envelope-blank without waiting for the seal-flap to dry its gum, and dispensing with the use of differently arranged gummers or different adhesive substances, if the mechanism were arranged to gum one flap before the other, or by gummers acting independently of each other.

Figure 1:
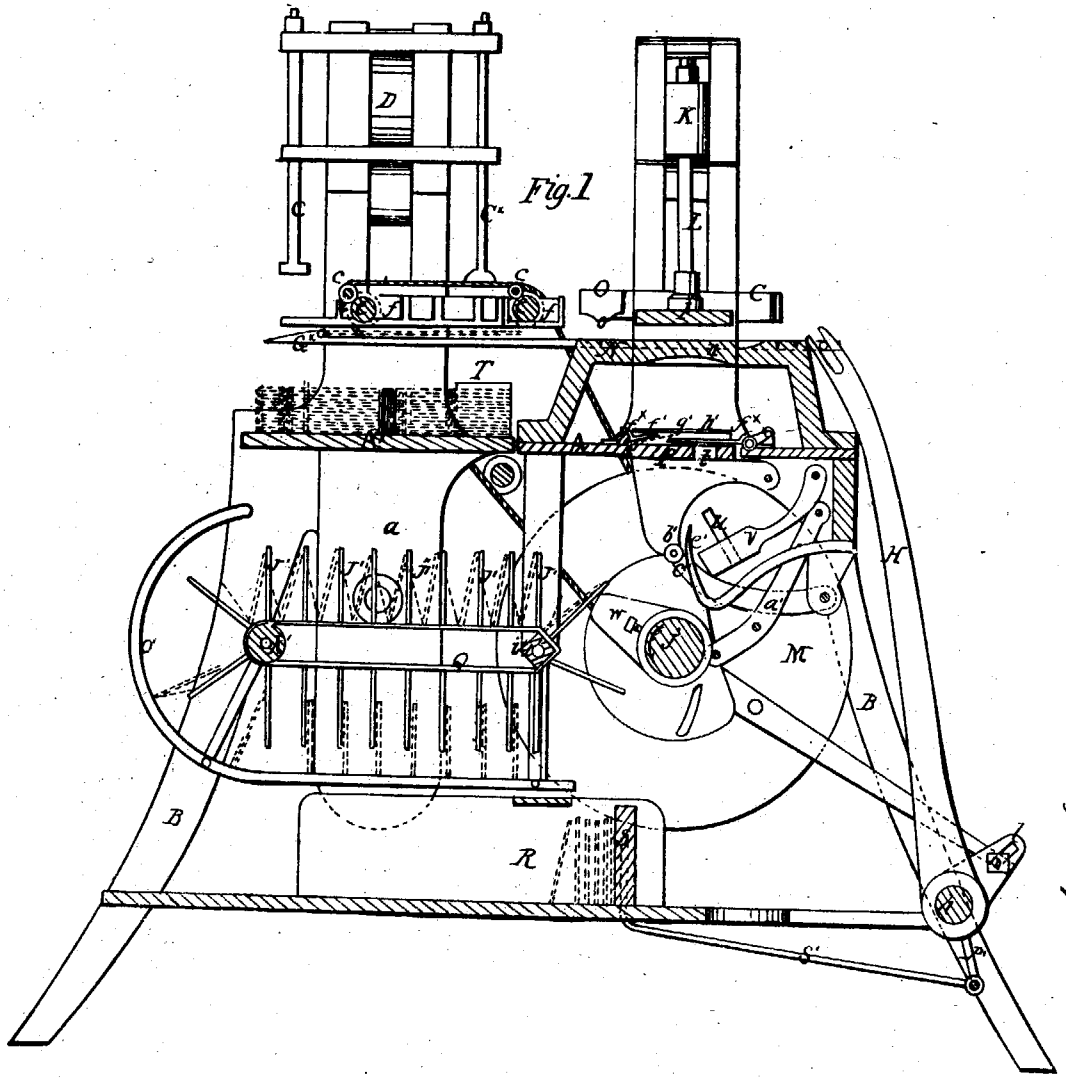
Figure 1 is a longitudinal vertical section of the machine through the line *x x*, fig. 3, and looking in the direction of the arrow 1 opposite that line.

After the gummers or pickers C C* have descended upon the blanks they rise again, carrying up with them the uppermost blank, which adheres to them, by reason of the nature of the gum, until such blank comes in contact with the under surface of the platform supporting the gum-box, when the blank is disengaged from the gummers or pickers and deposited on the carriers G*, to which a reciprocating motion is imparted by the action of an arm, H, mounted on a rock-shaft, *h**, which rock-shaft receives an oscillating motion by means of an eccentric, *i**, mounted on the driving-shaft *j*, and connecting with such rock-shaft by a strap, *k*, and arm, *l*, as shown in figs. 1 and 4.

By the carriers G* the blank is brought under the creasing-plunger I, which is secured to an arm, K, extending from a slide, L, to which a rising and falling motion is imparted by the action of a cam, M, a detached face view of which is shown in fig. 3, such cam being provided with a notch, *m*, so that the slide L can be withdrawn when desirable.

The plunger I forces the blank down through an aperture, *n*, in the creasing-platform N, the blank being disengaged from the carriers, and deposited on the creasing-platform before the plunger descends, by the action of a forked lever, O. Such lever is hinged to the standard which forms the guide for the plunger-slide L, and straddles the plunger, as shown in fig. 1.

To one of the arms of such lever is attached a die, *o*, which, when brought down upon the blank while it rests upon the creasing-platform N, produces upon the seal-flap any mark or figure desired, as an initial letter, monogram, &c. To obtain the requisite blow to produce the stamp on the seal-flap, a nose, *p*, is affixed to the periphery of the cam F, which, in passing a lip or arm, *q*, projecting from the rear end of the lever O, (shown more plainly in fig. 4,) imparts to such lever a quick oscillating motion, causing the die *o* to come down upon the creasing-platform with sufficient force to produce the desired effect. A spring, *r*, keeps the lip or arm *q* in contact with the periphery of the cam F. The action of such die *o* may be facilitated by inserting into the creasing-platform a corresponding die, but reverse from the first, or a die may be inserted in the platform N, and a pad of soft material be attached to the lever O. By this arrangement any desired character or design may be stamped or embossed on the seal-flap of an envelope while the blank is passing from the gumming to the folding machine.

By the descent of the plunger I through the aperture *n* the blank is creased, and in this condition it is brought down upon the folding-table P. By engraving or otherwise producing on this table, or in the face of the creasing-plunger, or in both, a suitable or desired design or die, *s*, (see figs. 3 and 7,) the body of the envelope can be embossed or stamped with any desired character or pattern.

The folding-table P is perforated with a rectangular slot, *t*, to admit the printing-types *u*. Such types are fixed in an arm, *v*, which is hinged to the under surface of the bed A, and which is raised at the proper intervals by the action of a cam, *w*, on a hinged lever, *a'*, the upper end of which bears on the type-carrying arm *v*, as shown in fig. 1. The types *u* are supplied with ink by means of a roller, *b'*, which is secured to an oscillating arm, *c'*, to which motion is imparted by a cam, *d'*, so that such roller is caused to travel over the ink-supplying surface *e'*, and to transfer the ink taken up therefrom to the types just before they are caused to rise. By means of such types any desired word or sentence can be printed on the envelope. The types are fastened in the arm $v$, so that they can be readily changed or removed and replaced by others, according to the words to be printed on the envelope. The printing action of the types takes place during the short interval of time for which the plunger I rests on the folding-table P, and the arm $v$ recedes simultaneously with said plunger, but in an opposite direction.

As soon as the plunger has ascended a sufficient distance from the platform P, the folding-wings $f'$ $g'$ $h'$ $i'$ turn down in quick succession, the wings $g'$ $i'$ turning down first, and folding down the end flaps; then the wing $h'$, folding the back flap, and lastly the wing $f'$, which folds the seal-flap. The wings $g'$, $i'$, and $h'$, after having been turned down, remain stationary until the seal-flap is turned down, and such wings are so shaped that the gummed part or edge of the seal-flap will not be allowed to come in contact with any of the other flaps, and consequently such seal-flap will be prevented from adhering to the other part of the envelope. This object may be effected by means of projections standing up from the wings $g'$ $h'$ $i'$, and may also be effected by introducing any foreign substance, or by the insertion of arms, fingers, or rods, of suitable shape and material, or by the introduction of extra wings or flaps between the seal-flap and the other flaps, independent of or connected with the plunger or any other part of the machine, or any mechanical arrangement which will prevent the gummed part of the seal-flap coming in contact with and adhering to the other flaps, and an extra flap or wing that might be inserted might at the same time apply the gum to the seal-flap. The wings $g'$ $h'$ $i'$ $f'$ are operated by suitable cams on the driving-shaft, in the usual manner. Such wings are also provided with lips, $f^*$, which extend over the joints, as shown in figs. 1, 4, and which prevent the oil used in lubricating the joints from coming in contact with the blanks. By the application of such lips the use of jointed folding-wings is rendered practicable. A raised rim, $g^*$, near the edge of the folding-wing $h'$, which folds the lower flap, presses on the gummed part of such flap, and causes the same to adhere to the end flaps without fail.

Figure 2:
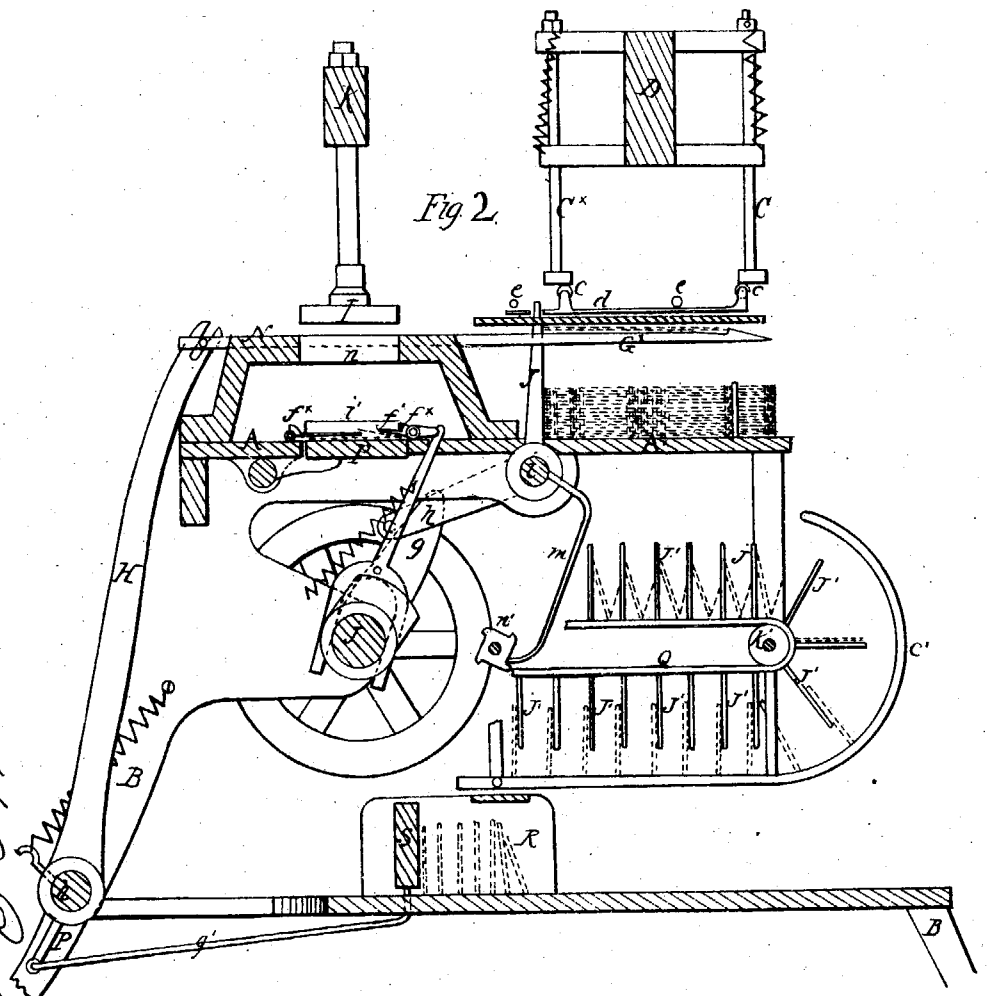
Figure 2 is a similar section through the same line, but looking in the direction of arrow 2.

After the operation of folding a blank has been completed, as before described, the folding-wings turn back to their original position, and the folding-table P is tilted, causing the folded envelopes to slide from off such table, and drop one by one into or between two of the radiating arms or plates $j'$, which project from an endless apron, Q. This apron passes over two rollers, $k'$ $l'$, and an intermittent motion is imparted to it by the action of an arm, $m'$, on a ratchet-wheel, $n'$, which is mounted on the shaft of the roller $l'$ at the receiving end of the apron. The roller $l'$ is square, so that the arms or plates $j'$ will spread or open as they pass over it. The arm $m'$ is secured to the rock-shaft $i$, as shown in fig. 2, so that the apron is moved at the proper times. By such apron, as it is moved, the folded envelopes are carried along, and are prevented from dropping out before they reach the proper place of discharge by the rail $o'$, which curves up around the apron where it passes over the roller $k'$, and lies underneath it, as shown in figs. 1 and 2, and while being so carried along by said apron the gum on the seal-flaps has time to dry. The envelopes, on being discharged from the apron, drop into a receiving-box, R, which is provided with a follower, S, to which a reciprocating motion is imparted by an arm, $p'$, which extends from the rock-shaft $h$, and connects with the follower S by a rod, $q'$. By this arrangement the envelopes as they drop into the box R are slightly compressed, so as to be ready to be put into bundles or packages. Other arrangements of mechanism may be substituted in the place of the endless apron Q, with its radiating plates, for receiving the envelopes as they are folded, and carrying or moving them, separate from each other, until the gum on the seal-flap has had time to dry, and the same result or end be attained as by the use of such apron Q.

What is claimed as new, and is desired to be protected by Letters Patent, is—

1. Gumming the seal-flaps of the blanks for envelopes at or about the same time with the lower or end flaps, after the blanks are placed in the machine, and before they are folded, by mechanism substantially such as described, or any other suitable mechanism to produce the same effect, for the purposes set forth.

2. The arrangement of a curved guide, T, in combination with the table supporting the blanks, substantially as and for the purposes set forth.

3. Causing the seal-flap, while being folded, to bear on one or more of the other folding-wings, or on parts or projections of said wings, or any device or mechanism interposed between the seal and other flaps, and producing the same effect, substantially as and for the purposes set forth.

4. The combination, with mechanism adapted to gum the seal and other flaps of envelope-blanks, of a folding mechanism, so arranged and operating as to prevent the seal-flap being brought in contact with the other flaps or parts of the blank, and adhering thereto.

5. The protecting lips $f^*$, in combination with the folding-wings, constructed and operating substantially as and for the purposes set forth.

6. The raised or projecting surface at or near the edge of the wing which folds the lower flap of the blank, substantially as and for the purposes set forth.

7. The endless apron Q, with its radiating arms, in combination with a suitable gumming and folding mechanism, constructed and operating substantially as and for the purposes set forth.

8. Passing the endless apron Q at its receiving end over a square or polygonal shaft, substantially as and for the purposes set forth.

9. In combination with the endless apron Q, the rail $o'$, or its equivalent, substantially as and for the purposes set forth.

10. The combination, with a suitable mechanism for gumming the flaps of envelopes and folding the envelope-blanks, of an endless apron, as described, or any equivalent device or mechanism for receiving the envelopes after they are folded, and moving or supporting the same, without compression, until the gum on the seal-flaps is dried.

11. In combination with the endless apron Q, or its equivalent, the receiving-box R and follower S, constructed and operating substantially as and for the purpose set forth.

12. The lever-arm O, in combination with the carrying-platform N, and a suitable die inserted in or attached to said lever, or to the platform, or to both, substantially as and for the purposes set forth.

13. The arrangement of dies *s* on the creasing-plunger and on the folding-table, or on either, substantially as and for the purpose set forth.

14. The types *u*, arranged in an arm, and operating, in combination with the folding-table and creasing-plunger, substantially as and for the purposes set forth.

H. C. BERLIN,
GEO. H. JONES.

Witnesses:
S. D. LAW,
FRED. B. SEARS.